United States Patent [19]

Schroeder

[11] 3,860,052

[45] Jan. 14, 1975

[54] CORDLESS VEHICLE TIRE

[75] Inventor: Herman E. Schroeder, Hockessin, Del.

[73] Assignee: E. I. du Pont de Nemours and Company, Wilmington, Del.

[22] Filed: Jan. 11, 1972

[21] Appl. No.: 217,033

[52] U.S. Cl................ 152/354, 152/357, 156/110, 156/128 T, 161/190, 161/231, 161/247, 161/253
[51] Int. Cl.............................................. B60c 3/00
[58] Field of Search ........... 152/357, 354, 330, 374; 260/860, 77.5 AT, 75 T, 75; 264/315, 326; 161/190, 231; 156/110 R, 110 A, 128, 394, 110 D, 128 T

[56] References Cited
UNITED STATES PATENTS

| | | | |
|---|---|---|---|
| 2,757,701 | 8/1956 | Henson | 156/110 R |
| 2,865,891 | 12/1958 | Michel | 260/75 R |
| 2,929,800 | 3/1960 | Hill | 260/77.5 AT |
| 3,013,914 | 12/1961 | Willard | 260/75 R |
| 3,023,192 | 2/1962 | Shivers | 260/75 R |
| 3,208,500 | 9/1965 | Knipp et al. | 152/330 |
| 3,385,342 | 5/1968 | Eckert | 152/330 |
| 3,462,328 | 8/1969 | Buckland | 161/190 |
| 3,533,460 | 10/1970 | Kiley | 161/190 |
| 3,560,591 | 2/1971 | Tanaka et al. | 260/860 |
| 3,648,748 | 3/1972 | Lovell | 152/330 |
| 3,651,014 | 3/1972 | Witsiepe | 26/75 R |
| 3,701,374 | 10/1972 | McGillvary | 152/330 |

OTHER PUBLICATIONS

Rubber World, June, 1971, pp. 51–55.

*Primary Examiner*—George F. Lesmes
*Assistant Examiner*—R. J. Roche

[57] ABSTRACT

A cordless vehicle tire comprising an elastomeric polyetherester or polyurethane sidewall adhered to an elastomeric ethylene/propylene/non-conjugated diene polymer in the form of a tread, and a process for producing such tires.

10 Claims, No Drawings

CORDLESS VEHICLE TIRE

BACKGROUND OF THE INVENTION

This invention relates to a novel cordless vehicle tire and method for its manufacture.

Conventional vehicle tires containing cords are notoriously non-uniform and almost invariably require balancing when mounted in order to provide a smooth ride and even tire wear. A tire which is uniform to a greater extent than conventional tires in weight distribution would represent a substantial advance as eliminating the expense of balancing and improving smoothness of operation. Prior attempts to produce such tires have been unsuccessful — tires presently available commercially invariably require balancing, and perfect balancing is a practical impossibility.

Additional problems posed by conventional tires are that in order to obtain adequate rubber-to-cord adhesion, cords must be coated with one or more layers of complex adhesive compositions which requires the use of costly equipment. The cords in conventional tires also impose problems caused by factors such as stiffness, the tendency of polyester cords to degrade from attack by some rubber curing agent by-products and nylon's "thumping" caused by set occurring after the tire has been kept under load in one position. Futhermore, the elastomeric matrix of a conventional tire carcass built from layers of rubberized plies tends to be non-homogeneous which leads to a non-uniform cure and potential weak spots in the tire carcass.

SUMMARY

According to this invention there is provided a vehicle tire with an elastomeric cordless carcass-sidewall (hereinafter "sidewall") adhered to an ethylene/propylene/non-conjugated diene copolymer tread. The carcass is made from a thermoplastic polyetherester elastomer or a polyurethane as hereinafter described.

Detailed Description

The thermoplastic copolyetheresters used in tire carcasses of this invention consist essentially of a multiplicity of recurring intralinear long chain and short chain units connected head-to-tail through ester linkages, said long chain ester units being represented by the following structure:

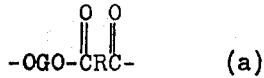     (a)

and said short chain ester units being represented by the following structure:

     (b)

wherein:

G is a divalent radical remaining after removal of terminal hydroxyl groups from poly(alkylene oxide) glycols having a carbon-to-oxygen atomic ratio of about 2.0–4.3 and a number-average molecular weight from about 600–3,000;

R is a divalent radical remaining after removal of carboxyl groups from a dicarboxylic acid; said acid having a molecular weight less than about 300; and D is a divalent radical remaining after removal of hydroxyl groups from a low molecular weight diol having a molecular weight less than about 250.

The term "removal" in the preceding paragraphs is used merely for definition purposes and does not mean that the groups referred to are actually removed in a process step to prepare the composition of this invention.

The short chain ester units constitute about 35–95 percent by weight of the copolyester; at least about 70 percent of the R groups must be 1,4-phenylene radicals, at least about 70 percent of the D groups must be 1,4-butylene radicals, and the sum of the percentages of the R groups which are not 1,4-phenylene radicals and of the D groups which are not 1,4-butylene radicals cannot exceed about 30 percent.

The term "long chain ester units" as applied to units in a polymer chain refers to the reaction product of a long chain glycol with a dicarboxylic acid. Such "long chain ester units," which are a repeating unit in the copolyesters used in this invention, correspond to formula (a) above. The long chain glycols are polymeric glycols having terminal (or as nearly terminal as possible) hydroxy groups and a molecular weight above about 600 and preferably from about b 600–3,000. The long chain glycols used to prepare the copolyesters are poly(alkylene oxide) glycols having a carbon-to-oxygen ratio of about 2.0–4.3. Representative long chain glycols are poly(ethylene oxide) glycol, poly(1,2- and 1,3-trimethylene oxide) glycol, poly-(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen atomic ratio in the glycol does not exceed about 4.3).

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols (other than 1,4-butanediol) which react to form short chain ester units are acyclic, alicyclic, and aromatic dihydroxy compounds. Preferred are diols with 2 to 15 carbon atoms such as ethylene, propylene, trimethylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2 to 8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which are reacted with the foregoing long chain glycols and low molecular weight diols to produce the copolyesters are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides, e.g., phosgene, and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Representative aliphatic and cycloaliphatic acids which can be used in making the polyetheresters are sebacic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$-$C_{12}$ alkyl and ring substitution derivatives thereof, such as halo, alkoxy and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyetheresters. Among the aromatic acids, those with 8 to 16 carbon atoms are preferred, particularly the phenylene dicarboxylic acids, i.e., terephthalic acid, phthalic acid and isphthalic acids.

It is essential that at least about 70 mole percent of the dicarboxylic acid incorporated into the copolyetherester be terephthalic acid and at least about 70 mole percent of the low molecular weight diol incorporated into the polyetherester be 1,4-butanediol. This means that 70 percent of the total R groups in formula (a) plus formula (b) above are 1,4-phenylene radicals. Thus, fewer than 70 percent of the R groups in either of formula (a) or formula (b) can be 1,4-phenylene radicals provided that at least 70 percent of the total R radicals in both formulas are 1,4-phenylene radicals. At least about 70 percent of the D groups in formula (b) above are 1,4-butylene radicals (derived from 1,4-butanediol). A further requirement of the polymers of this invention is that the sum of the percentages of the R groups which are not 1,4-phenylene radicals and of the D groups which are not 1,4-butylene radicals cannot exceed about 30 percent. For example, if 30 percent of the low molecular weight diol molecules used are other than 1,4-butanediol, then all of the dicarboxylic acid used must be terephthalic acid, or if 10 percent of the low molecular weight diol molecules used are other than 1,4-butanediol, then at least about 80 percent of the dicarboxylic acid used must be terephthalic acid. Copolyesters having fewer 1,4-butylene terephthalate units than is assured by the foregoing proportions do not impart adequate physical properties to the sidewall. The D and R units which are not 1,4-butylene and 1,4-phenylene, respectively, can be derived from low molecular weight diols or dicarboxylic acids such as those named above.

The copolyesters used in the tires of this invention contain about 35-95 percent by weight short chain ester units corresponding to formula (b) above, the remainder being long chain ester units corresponding to formula (a) above. Copolyesters containing less than about 35 percent by weight short chain units exhibit lower initial modulus and lower load bearing characteristics while copolyesters containing more than about 95 weight percent short chain units have poor low temperature properties and no longer exhibit elastomeric characteristics. The preferred range of short chain ester content is about 50-85 percent by weight.

Preferred copolyesters of this invention are those prepared from dimethyl terephthalate, 1,4-butanediol, and poly(tetramethylene oxide) glycol having a molecular weight of about 600-2,000 or poly(ethylene oxide) glycol having a molecular weight of about 600-1,500. Optionally, up to about 30 mole percent and preferably 5-20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600-1,600. Up to 30 mole percent and preferably 10-25 mole percent of the dimethyl terephthalate can be replaced with dimethyl isophthalate or butanediol can be replaced with neopentyl glycol until up to about 30 percent and preferably 10-25 percent of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water. The modulus of the copolyetheresters decreases as the proportion of short chain ester segments in the polymer decreases and as the proportion of the short chain segments which are derived from 1,4-butanediol and terephthalic acid decreases.

The dicarboxylic acids or their derivatives and the polymeric glycol are incorporated into the final product in the same molar proportions as are present in the reaction mixture. The amount of low molecular weight diol actually incorporated corresponds to the difference between the moles od diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The copolyesters described herein can be made conveniently by a conventional ester interchange reaction. A preferred procedure involves heating the dimethyl ester of terephthalic acid with a long chain glycol and a molar excess of 1,4-butanediol in the presence of a catalyst at 150°–260°C. while distilling off methanol formed by the ester interchange. This procedure results in the preparation of a low molecular weight prepolymer which can be carried to a high molecular weight copolyester of this invention by the procedure described below.

The resulting prepolymer is carried to high molecular weight by distillation of the excess of short chain diol. Additional ester interchange occurs during this distillation to increase the molecular weight and to randomize the arrangement of the copolyester units. Best results are usually obtained if this final distillation or polycondensation is run at less than 1 mm. pressure and 240°–260°C. for less than 2 hours in the presence of antioxidants such as symdi-beta-naphthyl-p-phenylenediamine and 1,3,5-trimethyl-2,4,6-tris[3,5-ditertiarybutyl-4-hydroxybenzyl]benzene. In order to avoid excessive hold time at high temperatures with possible irreversible thermal degradation, a catalyst for the ester interchange reaction should be employed such as tetrabutyl titanate used alone or in combination with magnesium or calcium acetates are preferred.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol.

Although the copolyetheresters possess many desirable properties, it may be advisable to stabilize the compositions to heat or radiation by ultraviolet light. This can be done by incorporating stabilizers in the polyester compositions such as phenols and their derivatives and amines and their derivatives such as sym-di-beta-naphthylphenylenediamine.

The properties of the copolyetheresters can be modified by incorporation of various conventional inorganic fillers such as carbon black, silica gel, alumina, clays, and chopped fiberglass. In general, these additives have the effect of increasing the modulus of the material at various elongations. Compounds having a range of hardness values can be obtained by blending hard and soft copolyesters described above.

Polyurethanes useful in making tire sidewalls of this invention are castable liquid prepolymers or thermoplastic elastomers which can be cast or molded to produce durable cured vehicle tire sidewalls. An eminently suitable product is a liquid isocyanato-terminated polyether having about 6.3 weight percent NCO groups and made by mixing one mold polytetramethyleneoxide glycol (number average molecular weight of 1,000) with two moles 2,4-tolylene diisocyanate for 3–4 hours at 80°C.

One such class of liquid isocyanato-terminated polyurethanes is prepared by heating at a temperature of about 50° to 100°C. a polymeric glycol having a number average molecular weight of at least 750 with a molar excess of an organic diisocyanate to prepare an isocyanate-terminated prepolymer. The molar ratio of diisocyanate to polyol used is about 1.2–4.1 and preferably about 1.2:1–3:1. At the higher molar ratios, there will be some free organic diisocyanate present in the polymer which will subsequently function as a crosslinking agent when the mixture of isocyanato-terminated polymer and active hydrogen-containing organic compound is finally cured by heating under pressure. The presence of free organic diisocyanate in the polymer is particularly desirable when higher molecular weight polymeric glycols are being used since it tends to effect a decrease in the viscosity of the mixture. The molecular weight of the polymeric glycol and the molar ratio of organic diisocyanate to glycol should generally be selected so that the isocyanate-terminated prepolymer is a liquid.

Of the polymeric glycols which are reacted with a molar excess of an organic diisocyanate to prepare the isocyanate-terminated polymer, the poly(alkylene oxide)glycols are preferred. These glycols have the general formula $H(OR)_xOH$, wherein R is an alkylene radical which need not necessarily be the same in each instance and $x$ is an integer so that the number average molecular weight of the glycol be at least 750. They may be prepared by the polymerization of cyclic ethers such as ethylene oxide, propylene oxide, dioxalane or tetrahydrofuran. For purposes of the present invention, the preferred polyalkyleneether glycol is a polytetramethyleneoxide glycol.

The polyalkyleneoxide-thiooxide glycols, prepared by condensing various glycols and thiodiglycol in the presence of a catalyst such as p-toluene sulfonic acid, can also be used.

The polyalkylene-arylene oxide glycols which can also be used are similar to the polyalkyleneether glycols except that some arylene radicals are present. In general, the phenylene and naphthylene radicals are preferred with or without substituents such as alkyl or alkylene groups. These polymeric glycols can be conveniently prepared by reacting a cyclic ether, such as ethylene oxide, with an arylene glycol.

The organic diisocyanates used include aromatic, aliphatic and cycloaliphatic types. Toluene-2,4-diisocyanate is preferred. Other representative diisocyanates, such as 4-methyl-1,3-cyclohexanediisocyanate, 4-methoxy-m-phenylene diisocyanate, 4,4'-biphenyl diisocyanate, 4,4'-methylenediphenyl diisocyanate, etc., can be used.

These polyurethanes can be cured by mixing with an active hydrogen-containing organic compound having at least two active hydrogen atoms, allowing the mixture to stand until it becomes a solid capable of being molded. Such materials containing free NCO groups can be finally cured by heat under pressure after they have been molded into the desired form. If the material is essentially free of —NCO groups, post-curing after molding is not necessary. This process of preparing a cured elastomer from a liquid prepolymer composition yields an elastomer having improved properties as compared to polyurethane elastomers prepared by mixing a liquid isocyanato-terminated prepolymer with an active hydrogen-containing organic compound, followed immediately by heating under pressure such as is done in casting operations.

The "one-shot" processes in which the diisocyanate polymeric polyol and curing agent are mixed substantially simultaneously can also be used to prepare polyurethane carcasses by both molding and casting especially when the curing agent is a polyol. Sulfurcured polyurethane elastomers, such as are described in U.S. Pat. No. 2,808,391 can also be used.

The active hydrogen-containing organic compounds are generally diamines or glycols, although compounds containing carboxyl groups can also be used. The term "active hydrogen atoms" refers to hydrogens which, because of their position in the molecule, display activity according to the Zerewitinoff test as described by Kohler in J. Am. Chem. Soc. 49, 3181 (1927). Representative compounds include dichlorobenzidine, 4,4'-methylene-bis(2-chloroaniline), 3,3-dichloro-4,4'-biphenyldiamine, 2,6-diaminopyridine, 4,4'-dihydroxydiphenyl, ethanolamine, aminobenzoic acid, butane-1,4-diol, etc. In addition to the above compounds, other organic compounds containing more than two atoms having active hydrogen can be used, such as trimesic acid, glycerol, triethanolamine, 2,4,6-triaminotoluene, trimethylolpropane, etc. Mixtures of these various active hydrogen-containing organic compounds can be used and water which acts as a chain-extender for isocyanato-terminated polymers can be used in admixture with any of the above described active-hydrogen compounds. The aromatic diamines of reduced activity are preferred, such as 3,3'-dichloro-4,4'-biphenyldiamine.

In general, the amount of organic compound to be used should be not less than an amount which yields at least 60 percent of the total number of active hydrogen atoms theoretically required to react with all of the isocyanato groups. The preferred amount of organic compound to be used is such that the number of active hydrogen atoms present in the compound be about 70–90 percent of the total number of free isocyanato groups present in the isocyanato-terminated polymer. This leaves from about 10–30 percent of the isocyanate groups to act as cross-linking agents when the isocyanate-terminated polymer/active hydrogen-containing organic compound mixture is finally cured by heating under pressure. It is to be understood that greater or lesser amounts of active hydrogen-containing organic compounds can be used and, when diamines are used, the number of groups bearing active hydrogen atoms may approach or even exceed the number of free isocyanato groups in the polymer. When the active hydrogen-containing compound and isocyanate-terminated polymer mixture is allowed to stand, the mixture becomes partially solidified since the organic compound functions as chain-extending agent and increases the molecular weight of the polymer.

The tread for the tires of this invention is made of a cured ethylene/propylene/non-conjugated diene (EPDM) copolymer which can be cast or molded in the desired form.

The most preferred elastomer for use in the EPDM tire treads is a terpolymer containing 57.7 weight percent ethylene, 40 weight percent propylene, and 2.3 weight percent 1,4-hexadiene; its Mooney viscosity (ML–1+4/121°C.) is 60. In general the preferred elastomers have 35–45 weight percent propylene and 2.1–2.5 weight percent 1,4-hexadiene, the balance being ethylene. There should be at least 35 weight percent propylene in order to minimize tread cracking; propylene content above 45 weight percent tends to increase tire wear. The diene content should be at least about 2.1 weight percent for adequate sulfur curing, but should not exceed about 2.5 weight percent in order to minimize tread cracking. The Mooney viscosity is selected to achieve a good balance between the requirements of processability and tread strength. Low Mooney copolymers are more easily processed than high Mooney copolymers; however, the latter are stronger. A Mooney viscosity in the vicinity of 60 (ML–1+4/121°C.) is most preferred.

For passenger tire use where minimum tread cracking is important, the copolymers should be substantially linear, that is, substantially free from side-chains containing a plurality of monomer units. The linear copolymers do, of course, have side-chains which are part of monomer units incorporated into the copolymer main-chain. Thus propylene units contribute methyl side-chains. In order to enhance the linearity it is desirable to keep the conversion of the 1,4-hexadiene (or other mono-reactive acyclic non-conjugated diene) below about 25 percent. Direactive dienes such as 1,7-octadiene and 2,5-norbornadiene should be absent.

The most preferred diene is 1,4-hexadiene. Acyclic mono-reactive non-conjugated dienes form a class of preferred dienes; the reactive double bond is mono-substituted whereas the other double bond is di, tri, or tetra substituted. Two examples of this class are 1,4-hexadiene and 11-ethyl-1,11-tridecadiene. It is to be understood that composite tires intended for less demanding uses, such as on off-the-road tractors and the like, can have EPDM treads made from branched copolymers and from copolymers containing less preferred nonconjugated dienes such as the bicyclic dienes, e.g., 5-ethylidene-2-norbornene, 5-methylene-2-norbornene, 5-ethyl-2,5-norbornadiene, 5-(2'-butenyl)-2-norbornene, and dicyclopentadiene. Alternative dienes include 1,5-cyclooctadiene, tetrahydroindene, and 4-vinyl-cyclohexene.

The EPDM's and methods for preparing them are well known in the art; see, e.g., U.S. Pat. Nos. 2,933,480; 3,000,866; 3,063,973; 3,093,620; 3,093,621 and 3,260,718.

Each 100 parts by weight of EPDM is most preferably compounded with 100 parts of ISAF carbon black (ASTM type N220) and 75 parts of paraffinic petroleum oil. Other preferred blacks are ATSM types 231 and 242. Carbon blacks of lower structure or greater size can be employed, but the tread will not display optimum performance. For reason of economics at least about 80 parts of black are used; tread wear may worsen if more than about 125 parts of black are used.

Paraffinic petroleum oil is preferred for extending the tread composition; alternatively, naphthenic petroleum oils are suitable. Aromatic petroleum oils are undesirable because their unsaturation consumes sulfur needed to cure the EPDM copolymer. The amount of oil required will depend on the amount of carbon black, higher proportions of black calling for higher proportions of oil (thus 40 phr oil for 80 phr black and 100 phr oil for 125 black).

The EPDM tread can be sulfur-cured using combinations of a wide variety of known reagents and techniques. Generally at least 3 parts of zinc oxide per 100 parts of EPDM are present to insure adequate vulcanizate strength; 5 parts are preferred and provide the best balance of cost and performance. The remaining components can be selected to provide bloom resistant treads when needed. A preferred non-blooming composition calls for 1 part stearic acid, 2.5-3 parts [(C$_4$H$_9$O)$_2$PS$_2$]$_2$ Zn [Monsanto's "Vocol"], 1.5 parts 2,2'-dithiobisbenzothiazole, and 1.5 parts sulfur per 100 parts of EPDM. Another nonblooming composition contains 1.5 parts tetraisopropyl thioperoxydiphosphate

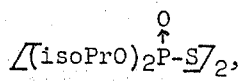

1.0 part 2-mercaptobenzothiazole (or 2,2'-dithiobisbenzothiazole), and 1.5 parts sulfur per 100 parts of EPDM. Still another non-blooming system contains 2 parts zinc dibutyldithiocarbamate, 0.5 part tetramethylthiuram disulfide, 0.8 parts 2-mercaptobenzothiazole, and 1.5-2 parts sulfur per 100 parts of rubber. A composition where bloom may occur has 1.5 parts tetramethylthiuram monosulfide, 0.8 part 2-mercaptobenzothiazole, and 1.5 parts sulfur. The EPDM sample containing the curing system is ordinarily heated to a temperature of 160°-204°C. for about 1-20 minutes to effect cure.

The composite vehicle tires of this invention can be made by adhering the preformed sidewall to the preformed tread. The preformed sidewall and tread can be made by conventional casting and compression and injection molding techniques and equipment. The tread is preferably made with conventional injection equipment adapted to injection mold elastomeric material and cure the molded product. The two preformed components are fitted together and adhered using a suitable adhesive, or one of these components can be formed and the other then formed in contact with the first formed component. When this procedure is followed it is preferred that the tread be made first and the sidewall formed in contact with the tread.

Preferred equipment for forming the tread is a reciprocating screw type injection molding machine in which shearing occurs to provide additional heating such as is described in Example 1 hereinafter. In such equipment, sufficient heat is built up to effect curing of the EPDM in the mold cavity in about 1-3 minutes In any case it is important that the EPDM tread be pretreated with an adhesive or other agent which promotes adequate adhesion between tread and sidewall. In a preferred embodiment of this invention the tread is pretreated (prior to contact with the sidewall) by irradiation in air with ultraviolet light in an amount of at least about three joules/cm$^2$ and then coated with a 5 percent solution of tris-(p-isocyanato phenyl) methane in methylene chloride or a similar solution of a mixture of polymeric polyisocyanates having the structure

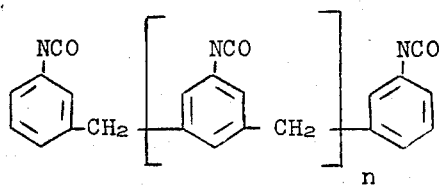

where $n = 0, 1, 2, \ldots$ for the component molecules and 0.3-0.4 for the mixture itself. Other pretreatments which may be used include treatments with flame, electrostatic fields, gas, magnetic fields, ozone and the like by conventional procedures for imparting tack or adhesiveness to EPDM polymer compositions.

It also may be desirable to mold the sidewall and tread in a form such that there are convolutions or grooves on the surface to be adhered to the other component. These convolutions thus interlock when the sidewall and tread are placed in contact and provide increased resistance to slippage at the tread-sidewall interface.

The sidewalls of this invention are outstanding in their physical properties. They have a Young's modulus of about 5,000-50,000 psi (332-3,520 kg./cm$^2$) at 30°C. [the preferred materials have a Young's modulus of about 10,000-30,000 psi (703-2,109 kg./cm$^2$) at room temperature], a tensile strength of at least 1,500 psi (106 kg./cm$^2$) [the preferred materials have a tensile strength of at least 2,500 psi (176 kg./cm$^2$) ] and they exhibit a creep elongation of not more than 5 percent when subjected to a tensile stress of 500-1,000 psi (35.5-70.3 kg./cm$^2$) for 1,000 hours. Because of these properties, the tire carcasses of this invention have excellent load-bearing properties and flex life. The copolyetheresters show superior performance over polyurethanes in sidewalls of this invention and are much preferred over the polyurethane sidewalls.

The EPDM treads exhibit outstanding resistance to ozone degradation and are tough, abrasion resistant and have excellent load-bearing qualities.

The tires of this invention are inexpensively and simply prepared, are substantially uniform throughout and are tough, durable and long wearing.

The invention is illustrated by the following examples wherein parts and percentages are by weight unless otherwise indicated.

EXAMPLE 1

A. Preparation of EPDM Tread Stock

The EPDM employed is a terpolymer having a Mooney viscosity (ML−1+4/121°C.) of about 60 and composed of units of the following monomers: ethylene (55 wt. percent); propylene (41 wt. percent); and 1,4-hexadiene (4 wt. percent). The polymer contains about 0.34 gram-moles of sulfur-curable ethylenic groups per kilogram.

This EPDM is compounded according to the following recipe to make a tread stock:

| Component | Parts by Weight |
|---|---|
| EPDM | 100 |
| Paraffinic petroleum oil* | 75 |
| ISAF carbon black** | 100 |
| Zinc oxide | 5 |
| Zinc stearate | 1.5 |
| Sulfur | 1.5 |
| 2-Mercaptobenzothiazole | 0.8 |
| Zinc dibutyldithiocarbamate | 1.5 |

* Commercially available as Sunpar 150 from Sun Oil Company. ASTM D-2226 Type 104B. Saybolt Universal Viscosity 508 at 37.8°C. and 64.3 at 98.9°C.
** ASTM type N220.

The above components are mixed in a Banbury internal mixer for 5 to 10 minutes.

B. Injection Molding of EPDM Tread (Cap)

The EPDM tread stock made in Part A above is fed into the heated barrel of a reciprocating screw type injection molding machine where shearing occurs to provide additional heat. Rotation of the screw meters a predetermined amount of the plasticized, homogenized material into the forward end of the barrel. The screw then stops rotating and moves forward to ram the hot material through the nozzle, runners and gates into a heated mold cavity where it is vulcanized to form a uniform one-piece seamless tread. During the early stages of vulcanization, the screw is held in the forward position at a predetermined pressure to consolidate the molding. After a given time, the screw starts turning and reciprocating, thereby feeding more plasticized material into the forward end of the barrel for the next injection.

In a typical operation, a one-piece tread is molded for a F 78-14 low profile passenger vehicle tire. An injection molding machine is employed capable of exerting a 1,350-ton (1,225 million kg.) clamping pressure on two halves of the single cavity mold.

Typically, the 10-lb. (4.5 kg.) charge of EPDM tread stock is at room temperature when fed into the barrel. The reciprocating screw inside is cored to allow passage of cooling water at normal room temperature, e.g., 20°–24°C. The outside barrel temperatures for the successive feed, compression and metering zones in the barrel are 48°–52°C., 66°C. and 79°–85°C., respectively. Typically, each zone occupies about a third of the length of the barrel. The screw rotates at 50 rpm. for about 50 seconds while compacting and heating the charge under a back pressure of about 50–250 psi (3.5–17.6 kg./cm²).

Coupled to the metering zone is a nozzle adapter at 77.2°C.; the surface of the nozzle immediately downstream is at 177°–194°C. Over a 30-second period the compacted tread stock is injected at 138°–149°C. under a pressure of 13,000–17,000 (914–1,195 kg./cm²) into the mold cavity and held at 13,000–17,000 psi (914–1,195 kg./cm²) for 15 seconds longer. Screw pressure is then released. After the stock has been in the mold for 90 seconds, the tread thus formed is cured enough to be removed. The injection molding cycle time (mold closing to mold closing) is 150 seconds. The read is then conveyed through a chamber where it is heated for 5 minutes at 190°C.

C. Applying an Adhesive to the Cured EPDM Tread

The underside (innerside) of the EPDM tread obtained in Part B above is irradiated with ultraviolet light (about 3 joules/cm.²), and then coated with a 5 percent solution of tris-(p-isocyanatophenyl) methane is methylene chloride. Care is taken to avoid abrading the adhesive surface obtained by drying this coating. The EPDM tread thus treated is ready to be joined to the unitary, cordless thermoplastic sidewalls described below.

D. Thermoplastic Segmented Copolyester A

Thermoplastic segmented copolyester A is prepared by ester interchange of 7.85 moles of dimethyl terephthalate, 1.0 mole of polytetramethyleneether glycol (having a number-average molecular weight of about 980) and excess 1,4-butanediol in the presence of a tetrabutyl titanate/magnesium acetate catalyst and a stabilizer [sym-di-beta-naphthyl-phenylenediamine]. This ester interchange is done at atmospheric pressure up to a final temperature of 220°C. Polycondensation at 250°C. at about 1 Torr follows for about 90 minutes. The resulting polymer has an inherent viscosity of about 1.45–1.55, measured at 30°C. on a solution of 0.5 gram of polymer in 100 milliliters of a mixed solvent containing 54 parts of phenol, 6 parts of water and 40 parts of 1,1,2-trichloroethane.

Copolyester A has a Shore D hardness of about 55 and a brittle point below −80°C.

E. Molding a Cordless Tire Having a Unitary Carcass and Sidewall of Copolyester A Adhered to the Cured EPDM Tread The cured EPDM tread made in Parts B and C is placed inside a 2-piece mold having a cavity in the shape of the finished vehicle tire. Also positioned therein are bead wires of brass-coated steel which have been degreased with toluene and primed with a 1-mil coat of "Thixon AB — 1244," a primer believed to be substantially a linear copolymer of epichlorohydrin and 4,4′-propylidenebisphenol having the structure

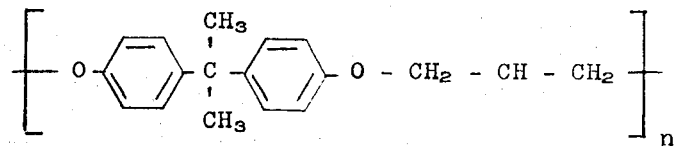

where $n$ is, on the average, about 25.

Segmented thermoplastic Copolyester A is injected into the mold where it forms a sidewall in contact with the adhesively coated underside of the cured EPDM tread. The injection molding is done using a reciprocating screw machine which mechanically operates in the same general manner as the machine used for injection molding the EPDM tread.

The following operating conditions can be used:

| Temperatures | |
|---|---|
| Feed stock | 177°C. |
| Feed zone of barrel | 177°C. |
| Compression zone of barrel | 202°C. |
| Metering zone of barrel | 221°C. |
| Nozzle and adapter | 221°C. |
| Mold | 49°C. |
| Pressures | |
| as in the EPDM tread stock | |
| Times | |
| Screw rotation | 30 sec. |
| Ram movement (injection of Copolyester A) | 30 sec. |
| Hold | 15 sec. |
| Mold Time | 30 sec. |
| Cycle Time | 90 sec. |

When the unitary, seamless, cordless, sidewall carcass (containing bead wire elements) is cooled below about 300°F. (149°C.), it behaves like a cross-linked elastomer. The composite article thus made is a cordless pneumatic passenger tire having a cured unitary EPDM rubber tread adhered to a thermoplastic, elastomeric, unitary polyester carcass-sidewall, brass-coated steel bead wires being adhesively embedded in said carcass. The Young's modulus of the carcass at 70°C. is about 20,000 pounds. There is excellent cut-growth resistance and flex resistance. Creep is less than 5 percent. The thin carcass results in a very desirable decrease in heat build-up during use compared to relatively high values associated with a conventional thicker carcass containing tire cords.

EXAMPLE 2

Preparation of a Vehicle Tire Having an Injection Molded Tread Adhered to a Cordless Injection Molded Polyurethane Sidewall and Carcass.

A. Preparation of Adhesively Coated EPDM Tread

A unitary EPDM tread is injection molded and cured in accordance with the procedure of Example 1. The underside (inner periphery) is cleaned with 1,1,1-trichloroethane, dried, irradiated with ultraviolet light (about 3 joules/cm.$^2$) and coated with the following adhesive composition:

|  | Parts by Weight |
|---|---|
| Liquid polyester A* "Desmocoll-12" (Farbenfabriken Bayer) | 3.3 |
| Liquid polyester B** "Desmocoll-22" (Farbenfabriken Bayer) | 1.6 |
| 4,4',4''-Methylidynetris (phenylisocyanate) | 3.4 |
| Methylene chloride | 13.6 |

* A highly branched liquid polyester containing 4.8-5.3 wt. % hydroxyl substituent groups and exhibiting (in each case at 20°C.) a density of 1.12 g/cm² and a viscosity of 1.55-165 poises.
** A slightly branched liquid polyester containing 1.7-2.0 wt. hydroxyl substituent groups. The density and viscosity at 20°C. are 1.18 g/cm² and 290-310 poises, respectively.

When dry, this coated tread is ready for use. The coating should not be abraded.

B. Preparation of Isocyanate-Terminated Polyether

A liquid isocyanate-terminated polyether having about 6.3 wt. percent NCO groups is made by mixing one mole of polytetramethyleneether glycol (number-average molecular weight 1,000) with two moles of 2,4-tolylene diisocyanate for 3-4 hours at 80°C.

C. Injection Molding Cordless Polyurethane Carcass and Sidewall Adhered to the Cured Unitary EPDM Tread The coated cured EPDM tread prepared in Part A above is placed inside a two-piece heated mold having a cavity in the shape of the low profile passenger tire described in Example 1. Also positioned therein are brass coated steel bead wires which have been primed by the procedure of Part E of Example 1.

A self-curable liquid polyurethane, made by mixing 19.7 parts (by weight) or 4,4'-methylenebis (2-chloroaniline) (at 120°C.) and 100 parts (by weight) of the isocyanate-terminated polyether of part B (at 100°C.) is injected at 100 psi (7.03 kg./cm²) into the mold cavity and kept there at 100°C. for about 5-7 minutes to form a tire carcass and sidewall adhered to the tread. The resulting tire is then removed from the mold and postcured at 120°C. for 1 hour.

I claim:

1. A cordless vehicle tire comprising a copolyetherester elastomer sidewall adhered to a tread consisting essentially of an ethylene/propylene/non-conjugated diene copolymer, said copolyetherester consisting essentially of a multiplicity of recurring long chain ester units and short chain ester units joined head-to-tail through ester linkages, said long chain ester units being represented by the formula I 

and said short chain units being represented by the formula

II 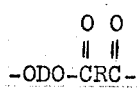

where G is a divalent radical remaining after the removal of terminal hydroxyl groups from a poly(alkylene oxide) glycol having a number-average molecular weight of about 600–3,000 and a carbon-to-oxygen atomic ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided, a. said short chain ester units amount to about 35–95 percent by weight of said copolyester,
b. at least about 70 percent of the R groups in formulae (I) and (II) are 1,4-phenylene radicals and at least about 70 percent of the D groups in formula (II) are 1,4-butylene radicals, and
c. the sum of the percentages of R groups in formulae (I) and (II) which are not 1,4-phenylene radicals and of D groups in formula (II) which are not 1,4-butylene radicals does not exceed about 30 percent.

2. A cordless vehicle tire of claim 1 wherein the tread polymer is an ethylene/propylene/1,4-hexadiene terpolymer.

3. A cordless vehicle tire of claim 1 wherein substantially all of the dicarboxylic acid used in making the copolyetherester is terephthalic acid.

4. A cordless vehicle tire of claim 1 wherein substantially all of the low molecular weight diol used in making the copolyetherester is 1,4-butanediol.

5. A cordless vehicle tire of claim 1 wherein the poly-(alkylene oxide)glycol is poly(tetramethyleneoxide)-glycol having a molecular weight of about 600–2,000.

6. A cordless vehicle tire of claim 1 wherein the short chain ester units constitute about 50–85 percent by weight of the copolyetherester.

7. A cordless vehicle tire of claim 1 wherein the dicarboxylic acid component of the copolyetherester is about 70–100 mole percent terephthalic acid, about 0–30 mole percent isophthalic acid and about 0–30 mole percent phthalic acid; the poly(alkylene oxide)-glycol component is poly(tetramethylene oxide)glycol having a molecular weight of about 600–2,000 and the diol component having a molecular weight less than 250 is 1,4-butanediol.

8. A cordless vehicle tire of claim 1 wherein the ethylene/propylene/non-conjugated diene is pretreated to impart adhesiveness to the copolymer.

9. A cordless vehicle tire of claim 1 wherein the ethylene/propylene/nonconjugated diene copolymer is irradiated in air with ultraviolet light and then coated with an organic isocyanate.

10. A cordless vehicle tire comprising a copolyetherester elastomer sidewall adhered to a tread consisting essentially of cured ethylene/propylene/non-conjugated diene elastomer, containing about 80–125 parts by weight of carbon black per hundred parts diene elastomer and about 40–100 parts paraffinic or naphthenic petroleum oil per hundred parts diene elastomer, said tread pretreated to impart adhesiveness to the copolymer, said copolyetherester consisting essentially of a multiplicity of recurring long chain ester units and short chain ester units joined head-to-tail through ester linkages, said long chain ester units being represented by the formula I 

and said short chain units being represented by the formula

II 

where G is a divalent radical remaining after the removal of terminal hydroxyl groups from a poly(alkylene oxide) glycol having a number-average molecular weight of about 600–3,000 and a carbon-to-oxygen atomic ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided, a. said short chain ester units amount to about 35–95 percent by weight of said copolyester,
b. at least about 70 percent of the R groups in formulae (I) and (II) are 1,4-phenylene radicals and at least about 70 percent of the D groups in formula (II) are 1,4-butylene radicals, and
c. the sum of the percentages of R groups in formulae (I) and (II) which are not 1,4-phenylene radicals and of D groups in formula (II) which are not 1,4-butylene radicals does not exceed about 30 percent.

* * * * *